(12) United States Patent
Yang et al.

(10) Patent No.: US 11,575,741 B2
(45) Date of Patent: Feb. 7, 2023

(54) SYSTEM AND METHOD FOR ACTIVE-ACTIVE STANDBY IN PHONE SYSTEM MANAGEMENT

(71) Applicant: Zoom Video Communications, Inc., San Jose, CA (US)

(72) Inventors: Yong Yang, San Jose, CA (US); Hongjian Zhao, Campbell, CA (US); Lei Zheng, Hefei (CN)

(73) Assignee: Zoom Video Communications, Inc., San Jose, CA (US)

(*) Notice: Subject to any disclaimer, the term of this patent is extended or adjusted under 35 U.S.C. 154(b) by 56 days.

(21) Appl. No.: 17/345,960

(22) Filed: Jun. 11, 2021

(65) Prior Publication Data
US 2022/0353326 A1 Nov. 3, 2022

Related U.S. Application Data

(63) Continuation of application No. PCT/CN2021/091156, filed on Apr. 29, 2021.

(51) Int. Cl.
*H04L 67/1034* (2022.01)

(52) U.S. Cl.
CPC .................. *H04L 67/1034* (2013.01)

(58) Field of Classification Search
None
See application file for complete search history.

(56) References Cited

U.S. PATENT DOCUMENTS

| | | | |
|---|---|---|---|
| 6,804,703 B1* | 10/2004 | Allen | H04L 69/40 714/13 |
| 7,818,408 B1* | 10/2010 | Ignatuk | G06F 11/2033 370/254 |
| 8,046,446 B1* | 10/2011 | Karr | H04L 67/1097 709/223 |
| 8,065,559 B2 | 11/2011 | Kamath et al. | |
| 8,335,943 B2 | 12/2012 | Kamath et al. | |
| 8,588,642 B2 | 11/2013 | Mori et al. | |
| 8,595,546 B2 | 11/2013 | Dalton | |
| 9,189,316 B2 | 11/2015 | Butterworth | |
| 9,274,906 B2 | 3/2016 | Calder et al. | |
| 9,286,171 B2 | 3/2016 | Cardona et al. | |
| 9,916,113 B2 | 3/2018 | Zohar et al. | |
| 2003/0005350 A1* | 1/2003 | Koning | H04L 69/40 714/4.11 |

(Continued)

FOREIGN PATENT DOCUMENTS

| | | |
|---|---|---|
| KR | 20150124642 A | 11/2015 |
| WO | 2008014639 A1 | 2/2008 |

*Primary Examiner* — Backhean Tiv
(74) *Attorney, Agent, or Firm* — Young Basile Hanlon & MacFarlane, P.C.

(57) ABSTRACT

Active-active standby is maintained for communication sessions using web connections between two active session zones and a standby session zone, for example, in the event of a failure. The first active session zone is located at a first datacenter, the second active session zone is located at a second datacenter, and the standby session zone is located at a third datacenter. In the event of a failure at a first active session zone at the first datacenter, a failover to the second active session zone at the second datacenter is performed. In the event of a failure at both active session zones, a failover to the standby session zone at the third datacenter is performed.

20 Claims, 7 Drawing Sheets

(56) References Cited

U.S. PATENT DOCUMENTS

| | | | |
|---|---|---|---|
| 2005/0108593 A1* | 5/2005 | Purushothaman | G06F 11/1484 714/4.11 |
| 2005/0198327 A1* | 9/2005 | Iwamura | H04L 67/1001 709/225 |
| 2011/0219121 A1* | 9/2011 | Ananthanarayanan | H04L 67/1036 714/E11.073 |
| 2014/0201314 A1* | 7/2014 | Borkenhagen | G06F 11/1666 709/216 |
| 2014/0229590 A1* | 8/2014 | Bennah | G06F 11/2025 709/221 |
| 2014/0317441 A1* | 10/2014 | Arata | G06F 11/2028 714/4.12 |
| 2018/0367433 A1 | 12/2018 | Luna et al. | |
| 2019/0020534 A1* | 1/2019 | Volz | H04L 67/51 |
| 2019/0327129 A1* | 10/2019 | Higuchi | H04L 41/0672 |

\* cited by examiner

SYSTEM AND METHOD FOR ACTIVE-ACTIVE STANDBY IN PHONE SYSTEM MANAGEMENT

CROSS-REFERENCE TO RELATED APPLICATION(S)

This application is a continuation of International Application Number PCT/CN2021/091156, filed Apr. 29, 2021, the entire disclosure of which is hereby incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of systems and methods for active-active standby in phone system management.

One aspect of this disclosure is a system for active-active standby in phone system management. The system may include a first load balancer, a second load balancer, and a database controller. The first load balancer may be associated with a first datacenter. The first load balancer may be configured to direct system management traffic associated with the first datacenter to a server associated with the first datacenter. The first load balancer may be configured to direct system management traffic associated with a second datacenter to a server associated with the second datacenter. The second load balancer may be associated with a third datacenter. The second load balancer may be a standby load balancer. The second load balancer may be configured to direct the system management traffic associated with the first datacenter and the second datacenter to a server associated with the third datacenter during a failure event. The database controller may be configured to perform a failover based on the failure event.

Another aspect of this disclosure is a method for performing a failover of phone system management traffic for an active-active standby system. The method may include detecting a failure event at a first datacenter. The first datacenter may include a first active session zone that includes system management traffic associated with the first datacenter. The method may include determining that the failure event occurred at a load balancer of the first active session zone. The method may include performing a failover of the system management traffic associated with the first datacenter. For example, the failover of the system management traffic may be to a standby load balancer if the standby load balancer is available, or the failover of the system management traffic may be to a second datacenter if the standby load balancer is not available.

Another aspect of this disclosure is a non-transitory computer-readable medium comprising instructions for performing a failover of phone system management traffic for an active-active standby system. The instructions, when executed by a processor, may cause the processor to detect a failure event at a first datacenter. The first datacenter may include a first active session zone that includes system management traffic associated with the first datacenter. The processor may determine that the failure event occurred at a web pod of the first active session zone. The processor may perform a failover of the system management traffic associated with the first datacenter. The failover of the system management traffic may be to a standby web pod if the standby web pod is available, and the failover of the system management traffic may be to a second datacenter if the standby web pod is not available.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
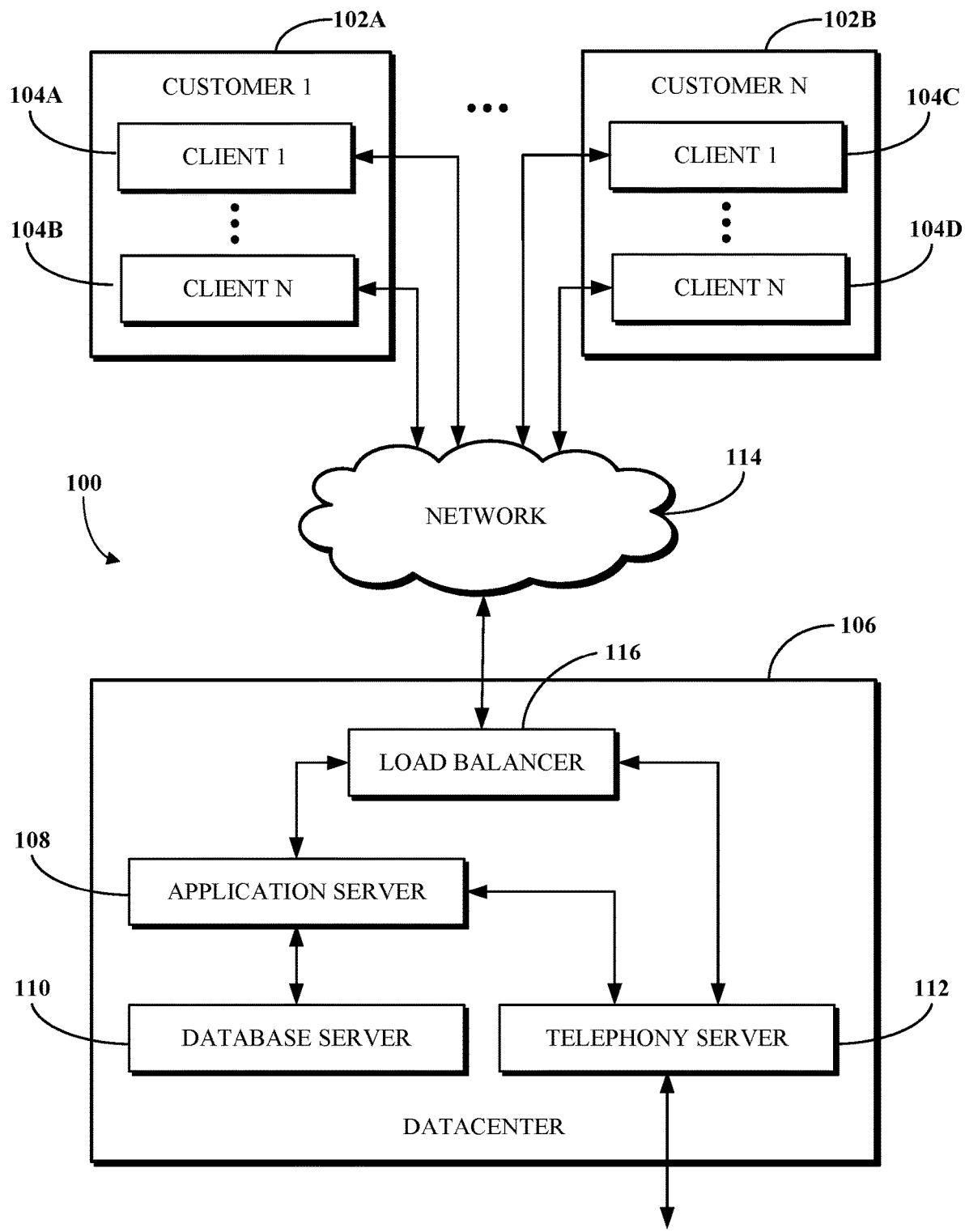
FIG. 1 is a block diagram of an example of an electronic computing and communications system.

Cloud-based services rely upon server infrastructure in datacenters. Typically, disparate computing services within a software platform, such as a UCaaS platform, share some resources such as libraries, codebase content, database records, and the like. Cloud-based services, however, may use containerization to isolate certain services while maintaining open channels between containers, as needed. Phone system management traffic in a private branch exchange (PBX) of the telephony services of the software platform may be implemented using software containers for instantiating the phone system management traffic. Phone system management traffic may be referred to herein as system management traffic or phone system management communications, and may include, or otherwise refer to an interaction associated with system management by an operator of a client with a software application of the software platform. For example, phone system management traffic may include traffic associated with system setup and maintenance such as porting phone numbers, adding phone users, purchasing and assigning phone numbers, provisioning phones and devices, changing account-level settings, customizing an auto receptionist, setting up multiple sites, management of call queues, and setting up call delegation and shared line groups. An example software container that may be used may be a Docker software container configured using Kubernetes.

A PBX may be highly scalable based on specific customer needs. However, in some cases, a customer may desire greater scalability for certain PBX services than for others. For example, a customer may desire greater scalability for messaging services over conferencing services. Problems in scalability may arise where resources of the PBX services are shared. For example, where resources of those services are shared, problems such as system instability or data loss may occur in phone system management and failover where application states need to be replicated or propagated.

Implementations of this disclosure address problems such as these by maintaining active-active standby sessions between a first active session zone in a first datacenter, a second active session zone in a second datacenter, and a standby session zone in a third datacenter, for example, in the event of a failure at the first datacenter, the second datacenter, or both datacenters. In the event of a failure at the first active session zone at the first datacenter, a failover to the second active session zone at the second datacenter may be performed. In the event of a failure at both active session zones, a failover to the standby session zone at the third datacenter may be performed. For example, when there is a failure at a first datacenter, a command center may change a Domain Name System (DNS) resolution to route traffic to a second datacenter. When both datacenters fail, a disaster recovery (DR) may be performed to switch to a third datacenter by changing the DNS resolution to route traffic to the third datacenter.

Each datacenter may include a server, such as a web server, that has at least an active load balancer and a standby load balancer such that if there is a failure at the active load balancer, the standby load balancer can take over phone system management traffic from the failed active load balancer. The active load balancer is configured to route the calls to the appropriate datacenter. Each datacenter may have multiple web pods arranged in clusters, such as, for example, Elastic Kubernetes Service (EKS) clusters, that share a database for phone system management. Each datacenter has its own database. A service, such as redis synchronization service (RSS), may be used to synchronize the cache across the datacenters.

A service may be implemented to synchronize the databases across the datacenters. Since this is a multi-tenant system, the calls are segregated by account ID to avoid duplication in the same database record. A global data table may be used to make the data available at each datacenter. The system may include a shared elastic search cluster that is synchronized in near-real time with the third datacenter. If there is a failure at the shared elastic search cluster, the elastic search cluster may be resumed at the third datacenter.

To describe some implementations in greater detail, reference is first made to examples of hardware and software structures used to implement active-active standby in phone system management. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network, for example, a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOW-enabled client of a customer to a second VOW-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOW-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
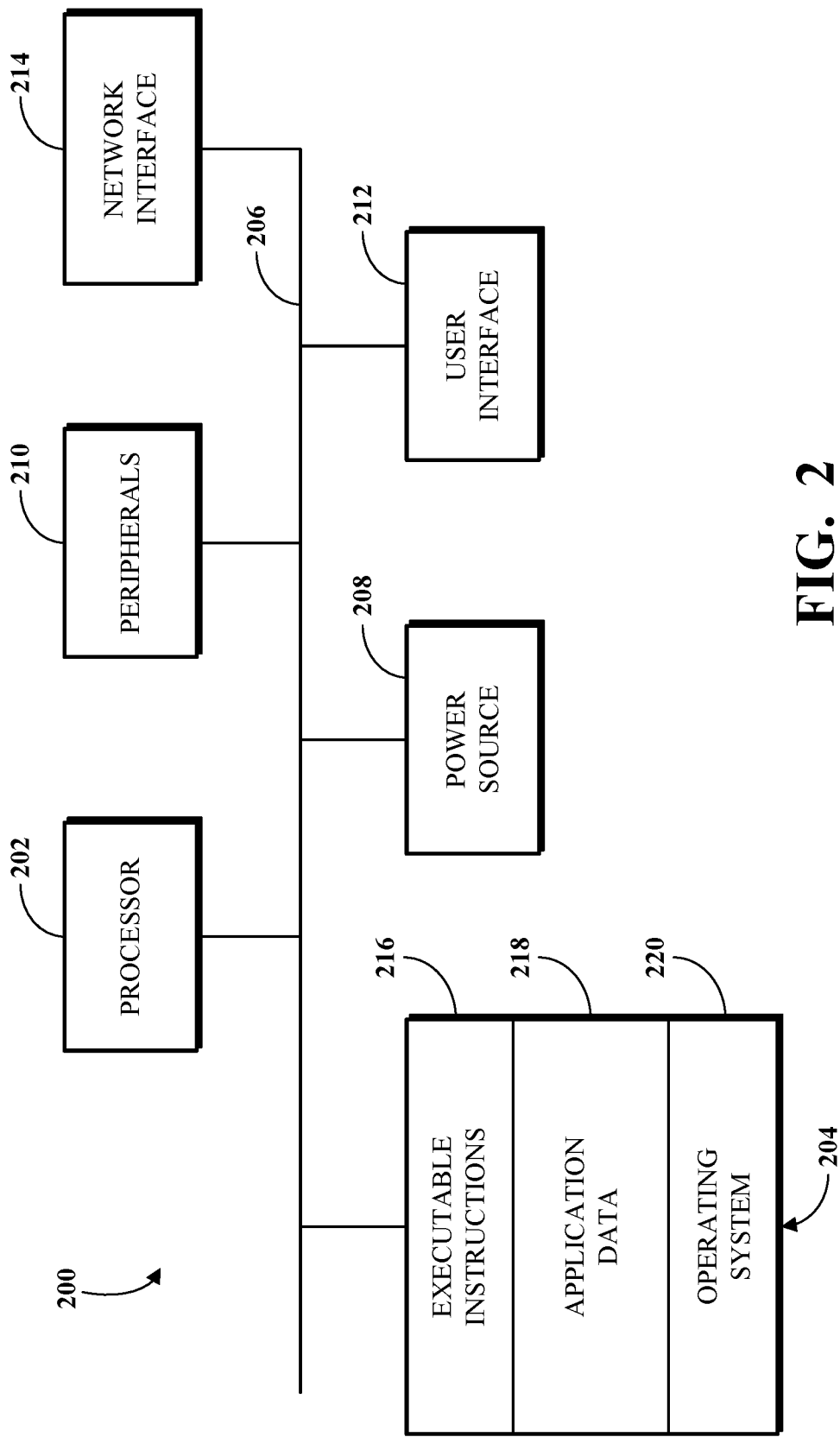
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the methods of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®, an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
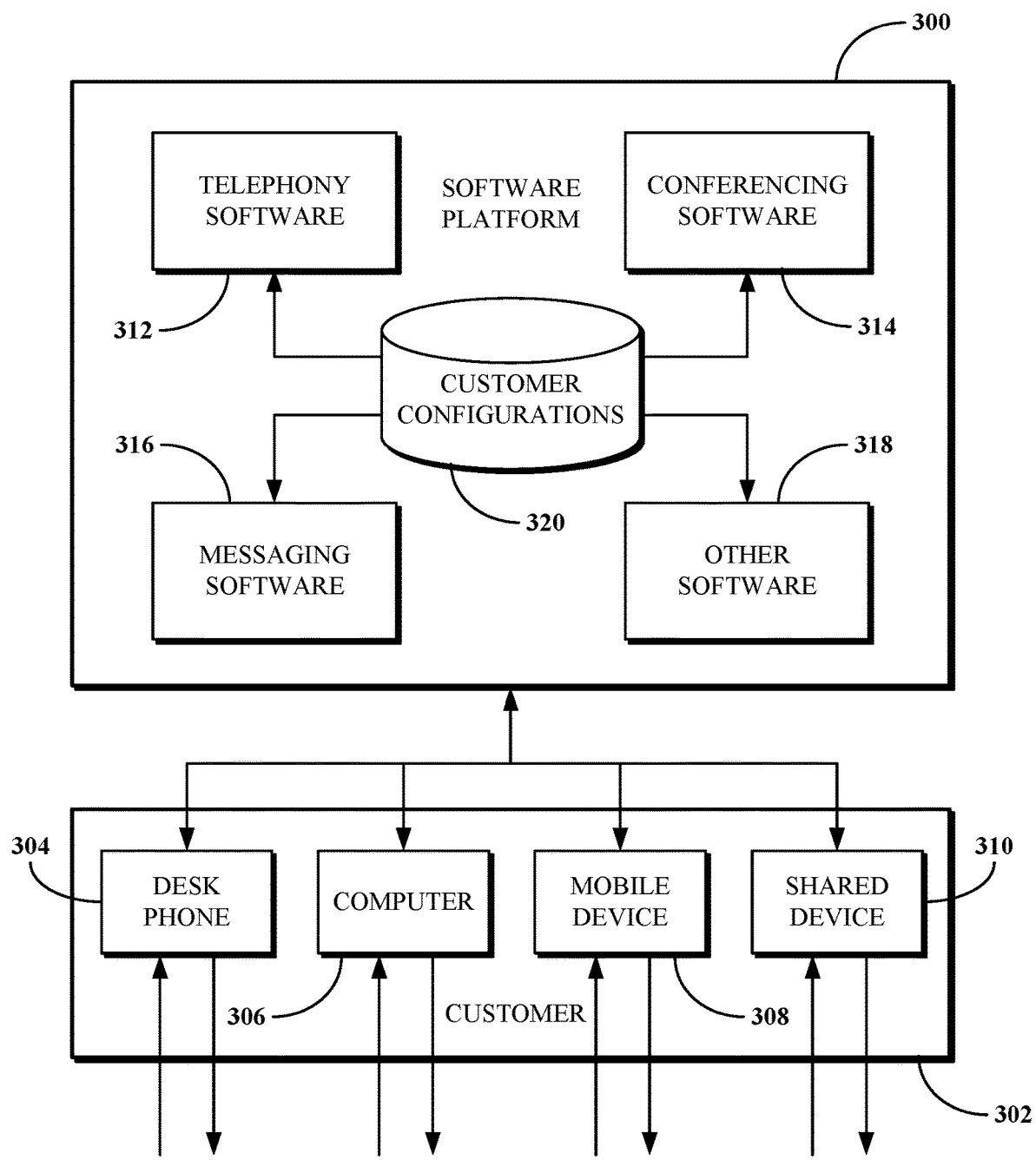
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOW-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 where same includes telephony features.

The telephony software 312 further enables phones which do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or like virtual conversation between users of those devices. The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include functionality to enable active-active standby for phone system management.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304-310.

Figure 4A:
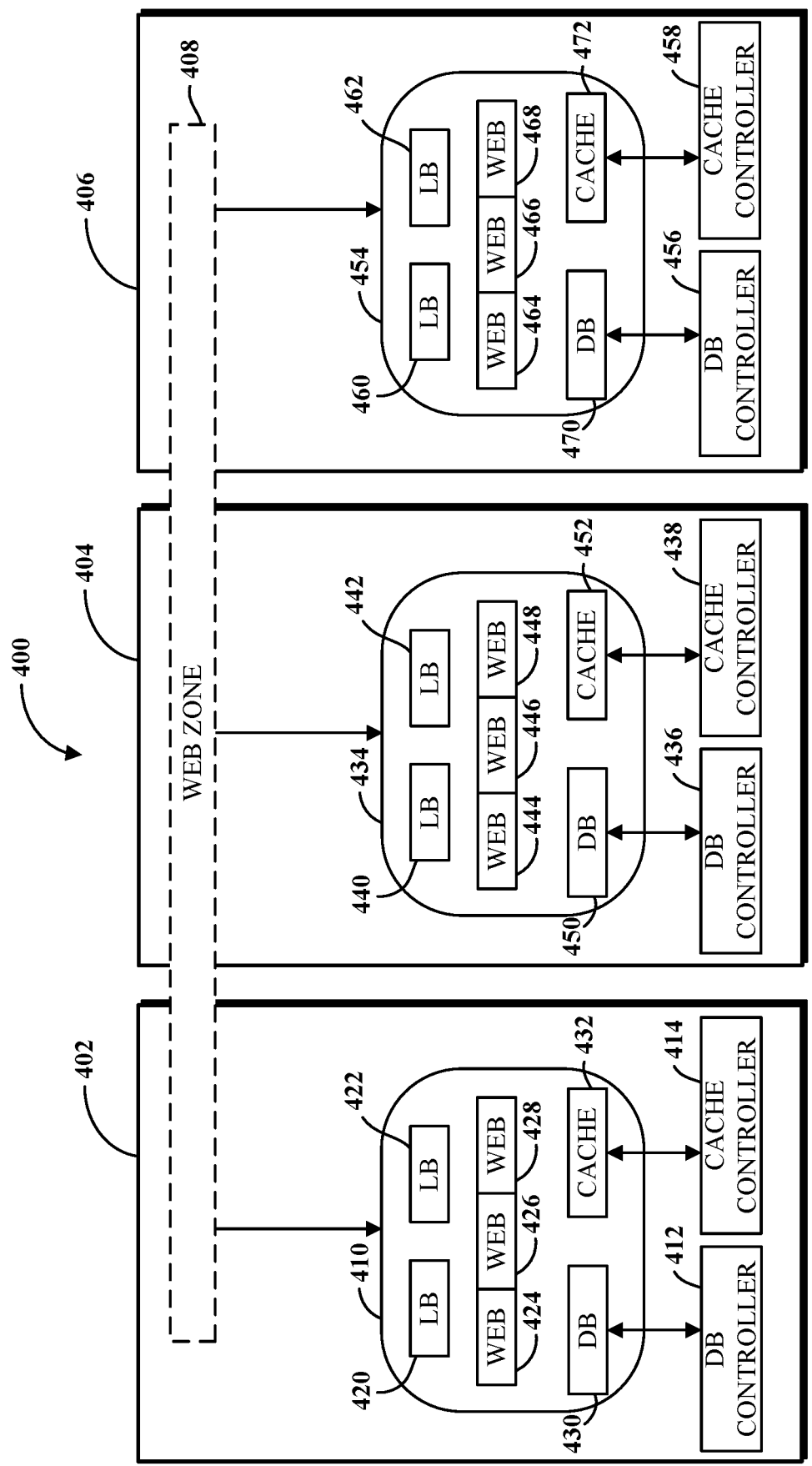
FIG. 4A is a block diagram of an example of a system for active-active standby in phone system management.

FIG. 4A is a block diagram of an example of a system 400 for active-active standby in phone system management. The system 400 includes a first datacenter 402, a second datacenter 404, and a third datacenter 406. Three datacenters are shown for simplicity and clarity, and the system 400 may include more than three datacenters. In this example, the first datacenter 402 is an active datacenter, the second datacenter 404 is an active datacenter, and the third datacenter 406 is a standby datacenter. A standby datacenter is a backup datacenter that is activated in the event of a failure at one or more of the active datacenters. The first datacenter 402 may be configured to handle calls associated with a first group of account identifiers (ID)s, and the second datacenter 404 may be configured to handle calls associated with a second group of account IDs. The first datacenter 402, the second datacenter 404, and the third datacenter 406 may communicate via a web zone 408 to perform phone system management, for example to set up and/or maintain the phone system. The web zone 408 may integrate telephony data with an application server, such as the application server 108 shown in FIG. 1, to enable telephony associated traffic access to software services, such as phone system management, run by the application server. In the event of a failure at the first datacenter 402, a failover of the phone system management traffic to the second datacenter 404 may be performed. In the event of a failure at the second datacenter 404, a failover of the phone system management traffic to the third datacenter 406 may be performed. The failover to the third datacenter 406 may include communications from the second datacenter 404, and communications from the first datacenter 402 that were failed over to the second datacenter 404.

The first datacenter 402 includes a first active session zone 410, a database controller 412, and a cache controller 414. The first active session zone 410 includes a first load balancer 420 and a second load balancer 422. The first active session zone 410 may include any number of load balancers, and two are only shown for simplicity and clarity. In this example, the first load balancer 420 is an active load balancer that is configured to route, or direct, computing communications traffic, such as phone system management traffic including signals or messages, to respective elements of the first datacenter 402. The first load balancer 420 is configured to receive phone system management traffic via the web zone 408. The first load balancer 420 is configured to failover to the second load balancer 422 when a failure event is detected at the first load balancer 420. The second load balancer 422 is a standby load balancer that functions as a backup in the event of a failure at the first load balancer 420. If there is a failure at the first load balancer 420, another load balancer of the first active session zone 410, such as the second load balancer 422, will route, or direct, the phone system management traffic to respective elements of the first datacenter 402. The first load balancer 420 and the second load balancer 422 are shown as an example, and in some implementations, the first active session zone 410 may include more than one active load balancer, more than one standby load balancer, or both.

The first active session zone 410 includes a first web pod 424, a second web pod 426, and a third web pod 428. The first active session zone 410 may include any number of web pods, and three are only shown for simplicity and clarity. The web pods may be pods that are configured to use Kubernetes (k8s) clustering. The web pods may be grouped into EKS clusters. One EKS cluster can have multiple pods for capacity, availability, and scalability. The number of pods may be automatically scaled, for example, based on resource utilization. In this example, the first web pod 424 and second web pod 426 may belong to a first EKS cluster, and the third web pod 428 may belong to a second EKS cluster. In this example, the first EKS cluster may be an active EKS cluster where the first web pod 424 and the second web pod 426 are configured to route, or direct, computing communications traffic, such as phone system management traffic including signals or messages, to respective clients. The first EKS cluster is configured to failover to the second EKS cluster when a failure event is detected at the first web pod 424, the second web pod 426, or both. The second EKS cluster may be a standby EKS cluster such that the third web pod 428 functions as a backup in the event of a failure at the first web pod 424, the second web pod 426, or both. If there is a failure at the first web pod 424, the second web pod 426, or both, another web pod of the first active session zone 410, such as the third web pod 428, will route, or direct, the phone system management traffic to respective clients. The first web pod 424, the second web pod 426, and the third web pod 428 are shown as an example, and in some implementations, the first active session zone 410 may include more than three web pods, and each EKS cluster may include the same number of web pods.

The first active session zone 410 includes a database 430. In an example, the first active session zone 410 may include a data store that is configured to store the phone system metadata. The database 430 may include data associated with phone system metadata, such as, for example, phone system management data including extension data, call handling data, phone setting data, call queue data, automatic receptionist data, or any combination thereof. Extension data may include metadata such as an extension number, for example. Automatic receptionist data may include one or more settings such as interactive voice response (IVR) configuration, business hours, audio prompt, time zone, and the like. The database 430 may be configured to synchronize data with another database via the database controller 412, which will be described in further detail below.

The first active session zone 410 includes a cache 432. The cache 432 may include data associated with the first active session zone 410. For example, the cache 432 may be a distributed cache that is used to save account information, extension metadata, or both, from the first active session zone 410. The cache 432 may be configured to synchronize data with another cache via the cache controller 414 such that if a failover occurs, a second active side, such as second active session zone 434, has cache from the first active session zone 410, which will be described in further detail below.

The second datacenter 404 includes a second active session zone 434, a database controller 436, and a cache controller 438. The second active session zone 434 includes a first load balancer 440 and a second load balancer 442. The second active session zone 434 may include any number of load balancers, and two are only shown for simplicity and clarity. In this example, the first load balancer 440 is an active load balancer that is configured to route, or direct, computing communications traffic, such as phone system management traffic, to respective elements of the second datacenter 404. The first load balancer 440 is configured to failover to the second load balancer 442 when a failure event is detected at the first load balancer 440. The second load balancer 442 is a standby load balancer that functions as a backup in the event of a failure at the first load balancer 440. If there is a failure at the first load balancer 440, another load balancer of the second active session zone 434, such as the second load balancer 442, will route, or direct, the phone system management traffic to respective elements of the second datacenter 404. The first load balancer 440 and the second load balancer 442 are shown as an example, and in some implementations, the second active session zone 434 may include more than one active load balancer, more than one standby load balancer, or both.

The second active session zone 434 includes a first web pod 444, a second web pod 446, and a third web pod 448. The second active session zone 434 may include any number of web pods, and three are only shown for simplicity and clarity. The web pods may be grouped into EKS clusters. In this example, the first web pod 444 and the second web pod 446 may belong to a first EKS cluster, and the third web pod 448 may belong to a second EKS cluster. In this example, the first EKS cluster may be an active EKS cluster where the first web pod 444 and the second web pod 446 are configured to route, or direct, computing communications traffic, such as phone system management traffic including signals or messages, to respective clients. The first EKS cluster is configured to failover to the second EKS cluster when a failure event is detected at the first web pod 444, the second web pod 446, or both. The second EKS cluster may be a standby EKS cluster such that the third web pod 448 functions as a backup in the event of a failure at the first web pod 444, the second web pod 446, or both. If there is a failure at the first web pod 444, the second web pod 446, or both, another web pod of the second active session zone 434, such as the third web pod 448, will route, or direct, the phone system management traffic to respective clients. The first web pod 444, the second web pod 446, and the third web pod 448 are shown as an example, and in some implementations, the second active session zone 434 may include more than three web pods, and each EKS cluster may include the same number of web pods.

The second active session zone 434 includes a database 450. In an example, the second active session zone 434 may include a datastore that is configured to store the phone system metadata. The database 450 may include data associated with phone system metadata, such as, for example, phone system management data including extension data, call handling data, phone setting data, call queue data, automatic receptionist data, or any combination thereof. The database 450 may be configured to synchronize data with another database, such as database 430. The data may be synchronized via database controller 412 and database controller 436. For example, data from database 430 may be obtained by database controller 412 and transmitted to database controller 436. Database controller 436 may transmit the data obtained from database 430 to the database 450. Similarly, data from database 450 may be obtained by database controller 436 and transmitted to database controller 412. Database controller 412 may transmit the data obtained from database 450 to the database 430. Further details of the synchronization of data between databases will be discussed with reference to FIG. 5.

The second active session zone 434 includes a cache 452. The cache 452 may include data associated with the second active session zone 434. For example, the cache 452 may be a distributed cache that is used to save account information, extension metadata, or both, from the second active session zone 434. The cache 452 may obtain the account information, extension metadata, or both, from the first active session zone 410. Similarly, the cache 432 may obtain the account information, extension metadata, or both, from the second active zone 434. For example, the cache controller 414 is configured to synchronize account information, extension metadata, or both, across cache 432 and cache 452 such that the account information, extension metadata, or both, of the first active session zone 410 is saved in both cache 432 and cache 452, and the account information, extension metadata, or both, of the second active session zone 434 is saved in both cache 452 and cache 432. For example, data from cache 432 may be obtained by cache controller 414 and transmitted to cache controller 438. Cache controller 438 may transmit the data obtained from cache 432 to the cache 452. Similarly, data from cache 452 may be obtained by cache controller 438 and transmitted to cache controller 414. Cache controller 414 may transmit the data obtained from cache 452 to the cache 432.

If there is a failure event at the first datacenter 402, for example at the second load balancer 422, the third web pod 428, or both, the first active session zone 410 is configured to failover to the second active session zone 434 at the second datacenter 404. The failover to the second active session zone 434 may be initiated at the cache controller 414. The cache controller 414 may determine a failure event at the first active session zone 410 based on the account information, extension metadata, or both. The cache controller 414 may transmit a message to failover the communications of the first active session zone 410 to the second active session zone 412. The message may include an indication or command to route the phone system management traffic associated with the first active session zone 410 to the second active session zone 434, and may be transmitted via the web zone 408, database controller 412, cache controller 414, or any combination thereof.

The third datacenter 406 includes a standby session zone 454, a database controller 456, and a cache controller 458. The third datacenter 406 is activated when there is a failure event at the first datacenter 402 and the second datacenter 404, such as a failure of the first active session zone 410 and the second active session zone 412. A DNS switch may be performed to failover to the third datacenter 406.

The standby session zone 454 includes a first load balancer 460 and a second load balancer 462. The standby session zone 454 may include any number of load balancers, and two are only shown for simplicity and clarity. In this example, the first load balancer 460 is an active load balancer that is configured to route, or direct, computing communications traffic, such as phone system management traffic including signals or messages, to respective elements of the third datacenter 406. The first load balancer 460 is configured to failover to the second load balancer 462 when a failure event is detected at the first load balancer 460. The second load balancer 462 is a standby load balancer that functions as a backup in the event of a failure at the first load balancer 460. If there is a failure at the first load balancer 460, another load balancer of the standby session zone 454, such as the second load balancer 462, will route, or direct, the phone system management traffic to respective elements of the third datacenter 406. The first load balancer 460 and the second load balancer 462 are shown as an example, and in some implementations, the standby session zone 454 may include more than one active load balancer, more than one standby load balancer, or both.

The standby session zone 454 includes a first web pod 464, a second web pod 466, and a third web pod 468. The standby session zone 454 may include any number of web pods, and three are only shown for simplicity and clarity. The web pods may be grouped into EKS clusters. In this example, the first web pod 464 and the second web pod 466 may belong to a first EKS cluster, and the third web pod 468 may belong to a second EKS cluster. In this example, the first EKS cluster may be an active EKS cluster where the first web pod 464 and the second web pod 466 are configured to route, or direct, computing communications traffic, such as phone system management traffic including signals or messages, to respective clients. The first EKS cluster is configured to failover to the second EKS cluster when a failure event is detected at the first web pod 464, the second web pod 466, or both. The second EKS cluster may be a standby EKS cluster such that the third web pod 468 functions as a backup in the event of a failure at the first web pod 464, the second web pod 466, or both. If there is a failure at the first web pod 464, the second web pod 466, or both, another web pod of the standby session zone 454, such as the third web pod 468, will route, or direct, the phone system management traffic to respective clients. The first web pod 464, the second web pod 466, and the third web pod 468 are shown as an example, and in some implementations, the standby session zone 454 may include more than three web pods, and each EKS cluster may include the same number of web pods.

The standby session zone 454 includes a database 470. The database 470 may include data associated with phone system metadata, such as, for example, phone system management data including extension data, call handling data, phone setting data, call queue data, automatic receptionist data, or any combination thereof. The database 470 may be configured to synchronize data with another database, such as database 430, database 450, or both. The data may be synchronized via database controller 412, database controller 436, database controller 456, or any combination thereof. For example, data from database 430 may be obtained by database controller 412 and transmitted to database controller 436. Database controller 436 may transmit the data obtained from database 430 to the database 450. Data from database 430 and database 450 may be obtained by database controller 456. Database controller 456 may obtain the data from database 430 via database controller 412 and obtain data from database 450 via database controller 436. Alternatively, database controller 456 may obtain data from database 430 and database 450 via database controller 436. Further details of the synchronization of data between databases will be discussed with reference to FIG. 5.

The standby session zone 454 includes a cache 472. The cache 472 may include data associated with the standby session zone 454. For example, the cache 472 may be a distributed cache that is used to save account information, extension metadata, or both, from the standby session zone 454. The cache 472 may obtain the account information, extension metadata, or both, from the first active session zone 410 of the first datacenter 402. Similarly, the cache 472 may obtain the account information, extension metadata, or both, from the second active zone 434 of the second datacenter 404. For example, the cache controller 458 is configured to synchronize account information, extension metadata, or both, across cache 432, cache 452, and cache 472 such that the account information, extension metadata, or both, of the first active session zone 410 and second active session zone 434 are saved in cache 432, cache 452, and cache 472. For example, data from cache 432 may be obtained by cache controller 414 and transmitted to cache controller 438. Cache controller 438 may transmit the data obtained from cache 432 to the cache 452. Data from cache 432 and cache 452 may be obtained by cache controller 458. Cache controller 458 may obtain the data from cache 432 via cache controller 414 and obtain data from cache 452 via cache controller 438. Alternatively, cache controller 458 may obtain data from cache 432 and cache 452 via cache controller 438.

If there is a failure event at the first datacenter 402, the first active session zone 410 is configured to failover to the second active session zone 434 at the second datacenter 404. Subsequently, if there is a failure event at the second datacenter 404, the first active session zone 410 and the second active session zone 434 are configured to failover to the third datacenter 406. The failover to the standby session zone 454 may be initiated at the cache controller 438. The cache controller 438 may determine a failure event at the second active session zone 434 based on the account information, extension metadata, or both. The cache controller 438 may transmit a message, for example, via RSS using Kafka, to failover the communications of the second active session zone 434, which may include the communications of the first active session zone 410 that were failed over to the second active session zone 434, to the standby session zone 454 to double write the data. The message may include an indication or command to route the phone system management traffic associated with the first active session zone 410, the second active session zone 434, or both, to the standby session zone 454, and may be transmitted via the web zone 408, database controller 436, cache controller 438, or any combination thereof.

Figure 4B:
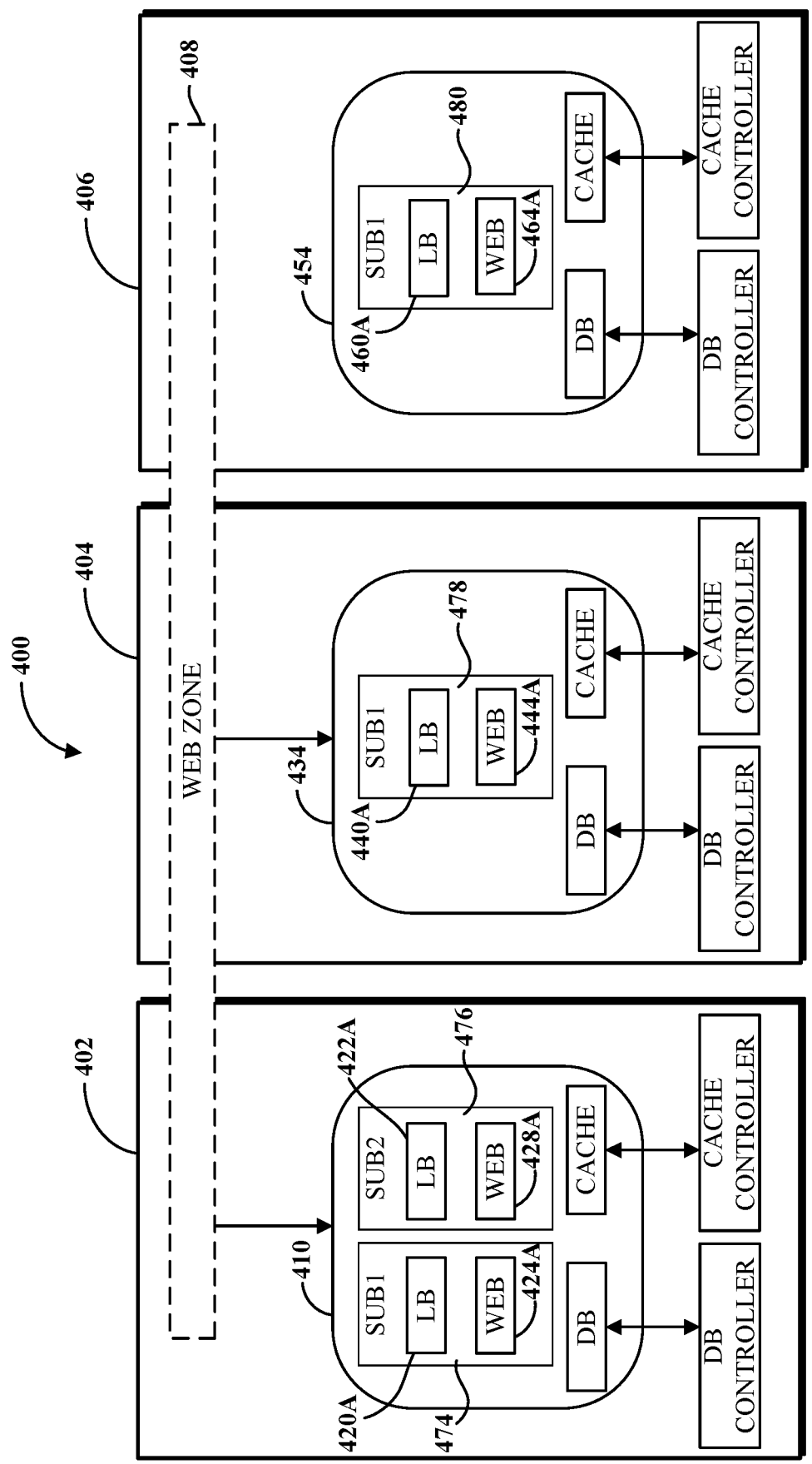
FIG. 4B is a block diagram of another example of the system shown in FIG. 4A.

FIG. 4B is a block diagram of another example of the system 400 shown in FIG. 4A. As shown in FIG. 4B, the first datacenter 402 has a first active session zone 410 that includes a first sub 474 and a second sub 476. The first sub 474 includes a load balancer 420A and a web pod 424A. In an example, the load balancer 420A may be a group of load balancers such that if there is a failure at one load balancer, another load balancer of the group may automatically take over. Similarly, the web port 424A may be a group of web pods such that if there is a failure at one web pod, another web pod of the group may automatically take over. The second sub 476 includes a load balancer 422A and a web pod 428A. In an example, the load balancer 422A may be a group of load balancers such that if there is a failure at one load balancer, another load balancer of the group may automatically take over. Similarly, the web port 428A may be a group of web pods such that if there is a failure at one web pod, another web pod of the group may automatically take over.

The second datacenter 404 has a second active session zone 434 that includes a first sub 478. The first sub 478 includes a load balancer 440A and a web pod 444A. In an example, the load balancer 440A may be a group of load balancers such that if there is a failure at one load balancer, another load balancer of the group may automatically take over. Similarly, the web port 444A may be a group of web pods such that if there is a failure at one web pod, another web pod of the group may automatically take over.

The third datacenter 406 has a standby session zone 454 that includes a first sub 480. The first sub 480 includes a load balancer 460A and a web pod 464A. In an example, the load balancer 460A may be a group of load balancers such that if there is a failure at one load balancer, another load balancer of the group may automatically take over. Similarly, the web port 464A may be a group of web pods such that if there is a failure at one web pod, another web pod of the group may automatically take over.

In the example shown in FIG. 4B, if there is a failure at the first sub 474, the phone system management traffic may be routed to the second sub 476. If there is a is a failure at both the first sub 474 and the second sub 476, the phone system management traffic may be routed to another datacenter, such as the second datacenter 404.

Figure 5:
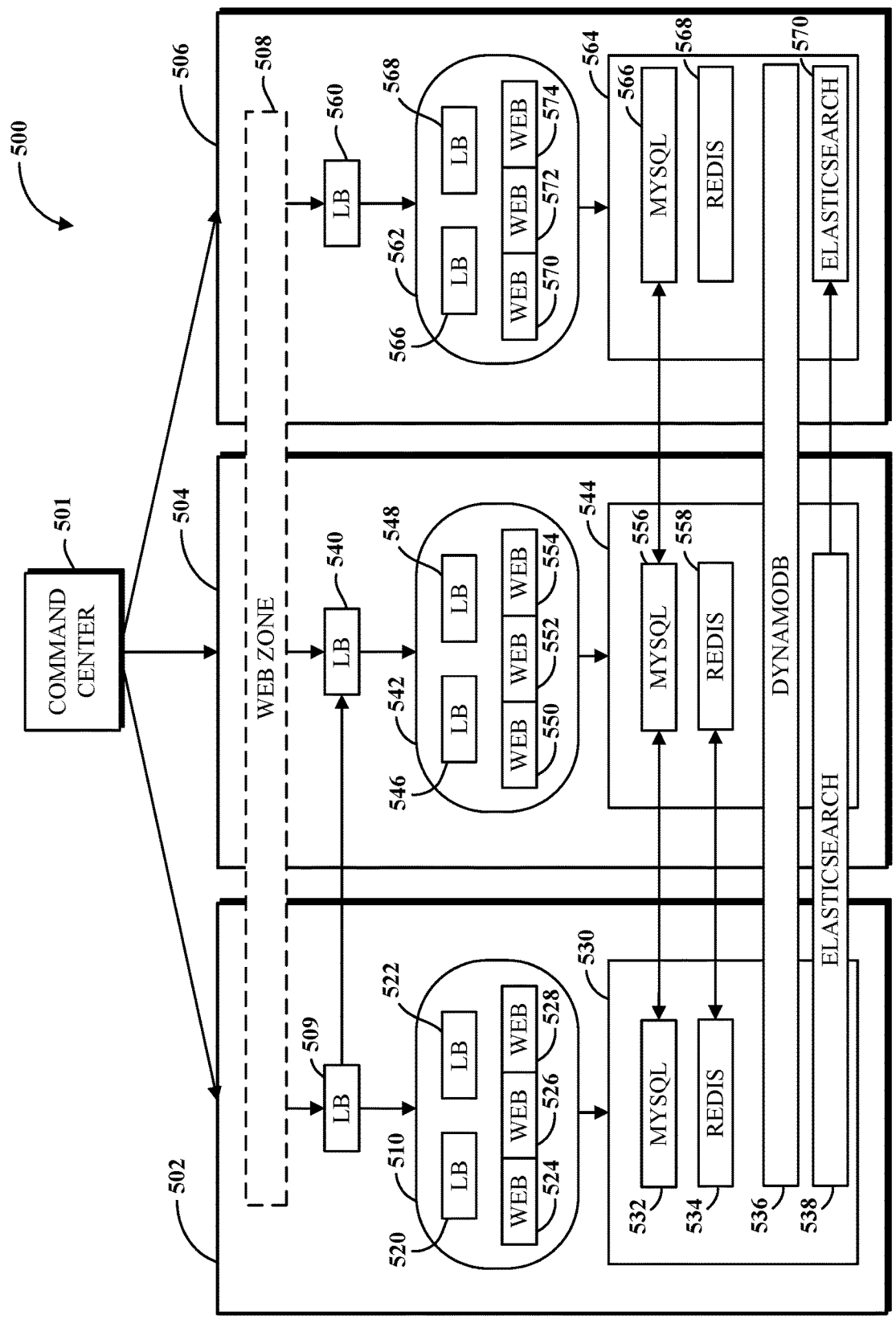
FIG. 5 is a block diagram of another example of a system for active-active standby in phone system management.

FIG. 5 is a block diagram of another example of a system 500 for active-active standby in phone system management. The system 500 includes a command center 501, a first datacenter 502, a second datacenter 504, and a third datacenter 506. Three datacenters are shown for simplicity and clarity, and the system 500 may include more than three datacenters. In this example, the first datacenter 502 is an active datacenter, the second datacenter 504 is an active datacenter, and the third datacenter 506 is a standby datacenter. The first datacenter 502 may be configured to handle calls associated with a first group of account IDs, and the second datacenter 504 may be configured to handle calls associated with a second group of account IDs. The first datacenter 502, the second datacenter 504, and the third datacenter 506 may communicate via a web zone 508 to perform phone system management, for example to set up and/or maintain the phone system. The web zone 508 may integrate telephony data with an application server, such as the application server 108 shown in FIG. 1, to enable telephony associated traffic access to software services, such as phone system management, run by the application server. In the event of a failure at the first datacenter 502, a failover of the phone system management traffic to the second datacenter 504 may be performed. In the event of a failure at the second datacenter 504, a failover of the phone system management traffic to the third datacenter 506 may be performed. The failover to the third datacenter 506 may include communications from the second datacenter 504, and communications from the first datacenter 402 that were failed over to the second datacenter 504.

The first datacenter 502 includes a load balancer 509, a first active session zone 510, and a storage component 530. The command center 501 is configured to route phone system management traffic to the first datacenter 502, the second datacenter 504, and the third datacenter 506. The command canter 501 may perform a failover of the phone system management traffic from the first datacenter 502 to the second datacenter 504 when a failure event is detected at the first datacenter 502. The command center 501 is configured to perform a failover of the phone system management traffic from the second datacenter 504 to the third datacenter 506 when a failure event is detected at the second datacenter 504.

The load balancer 509 is configured to receive a request associated with phone system management traffic via the web zone 508. The request may include information associated with an account, such as an account ID, and information associated with phone system management, such as, for example, extension data, call handling data, phone setting data, call queue data, automatic receptionist data, or any combination thereof. The load balancer 509 is configured to direct the phone system management traffic based on the account ID. For example, the load balancer 509 is configured to direct traffic associated with accounts associated with the first datacenter 502 to a server of the first datacenter 502 based on the account ID. The load balancer 509 is configured to direct traffic associated with accounts associated with the second datacenter 504 to a server of the second datacenter 504 based on the account ID. If the request does not include an account ID, the traffic may be directed to the first active session zone 510 by default. In an example where the request does not include an account ID, a check may be performed to determine if there is a phone number, a device medium access control (MAC) address, or both to determine the desired zone to route the traffic. A look up service may be used to determine the desired zone to route the traffic.

The first active session zone 510 includes a first load balancer 520 and a second load balancer 522. The first active session zone 510 may include any number of load balancers, and two are only shown for simplicity and clarity. In this example, the first load balancer 520 is an active load balancer that is configured to route, or direct, computing communications traffic, such as phone system management traffic including signals or messages, to respective endpoints of the first datacenter 502, including clients, devices, and the like which are configured to send and receive phone system management traffic. The first load balancer 520 is configured to receive phone system management traffic associated with the first datacenter 502 from the load balancer 509. The first load balancer 520 is configured to failover to the second load balancer 522 when a failure event is detected at the first load balancer 520. The first load balancer 520 and the second load balancer 522 may be nginx active nodes that are configured to serve traffic simultaneously. If one of the load balancers fails, then another load balancer will automatically take the traffic. For example, the second load balancer 522 is a standby load balancer that functions as a backup in the event of a failure at the first load balancer 520. If there is a failure at the first load balancer 520, another load balancer of the first active session zone 510, such as the second load balancer 522, will route, or direct, the phone system management traffic to respective endpoints of the first datacenter 502. The first load balancer 520 and the second load balancer 522 are shown as an example, and in some implementations, the first active session zone 510 may include more than one active load balancer, more than one standby load balancer, or both. In some examples, another active load balancer may be automatically created by an EKS when one of the load balancers fails.

The first active session zone 510 includes a first web pod 524, a second web pod 526, and a third web pod 528. The first active session zone 510 may include any number of web pods, and three are only shown for simplicity and clarity. The web pods may be grouped into EKS clusters. In this example, the first web pod 524 and second web pod 526 may belong to a first EKS cluster, and the third web pod 528 may belong to a second EKS cluster. In this example, the first EKS cluster may be an active EKS cluster where the first web pod 524 and the second web pod 526 are configured to route, or direct, computing communications traffic, such as phone system management traffic including signals or messages, to respective endpoints. The first EKS cluster is configured to failover to the second EKS cluster when a failure event is detected at the first web pod 524, the second web pod 526, or both. The second EKS cluster may be a standby EKS cluster such that the third web pod 528 functions as a backup in the event of a failure at the first web pod 524, the second web pod 526, or both. If there is a failure at the first web pod 524, the second web pod 526, or both, another web pod of the first active session zone 510, such as the third web pod 528, will route, or direct, the phone system management traffic to respective endpoints. The first web pod 524, the second web pod 526, and the third web pod 528 are shown as an example, and in some implementations, the first active session zone 510 may include more than three web pods, and each EKS cluster may include the same number of web pods. In some examples, another active web pod may be automatically created by an EKS when one of the web pods fails.

The storage component 530 may include a database component 532 and a cache component 534. The storage component 530 may store data associated with phone system metadata, such as, for example, phone system management data including extension data, call handling data, phone setting data, call queue data, automatic receptionist data, or any combination thereof, in the database component 532, the cache component 534, or both. The database component 532 may be a relational database management system, and may be an open source system, such as MySQL, for example. The database component 532 may be configured to synchronize data with another database component using a service, such as Otter, for example. The data may be synchronized using MySQL binlog capture and replay to replicate data from one database component to another database component.

The cache component 534 may store data associated with the first active session zone 510. For example, the cache component 534 may be a distributed cache, such as, for example, a redis in-memory data structure store, that is used to save account information, extension metadata, or both, from the first active session zone 510. The cache component 534 may be configured to synchronize data with another cache component using a service, such as Kafka, for example to double write cache data in both active session zones.

The storage component 530 may include one or more shared components, such as, for example, a shared database 536, a shared search component 538, or both. The shared database 536 may be, for example, a NoSQL database service that supports key-value and document data structure, such as DynamoDB global table to synchronize data across active session zones. The shared database 536 may be shared across the first datacenter 502, the second datacenter 504, and the third datacenter 506. The shared search component 538 may be, for example, a distributed, multitenant-capable full-text search engine with a hypertext transfer protocol (HTTP) web interface and schema-free JavaScript object notation (JSON) documents, such as an elasticsearch (ES) cluster shared by two active zones. An ES cluster may use an ES index for a call log, an audit log, or both. The shared search component 538 may be shared across the first datacenter 502 and the second datacenter 504.

The second datacenter 504 includes a load balancer 540, a second active session zone 542, and a storage component 544. The load balancer 540 is configured to receive a request associated with phone system management traffic via the web zone 508, load balancer 509, or both. The request may include information associated with an account, such as an account ID, and information associated with phone system management, such as, for example, extension data, call handling data, phone setting data, call queue data, automatic receptionist data, or any combination thereof. The load balancer 540 is configured to direct the phone system management traffic based on the account ID. For example, the load balancer 540 is configured to direct traffic associated with accounts associated with the second datacenter 504 to the respective endpoints of second datacenter 504 based on the account ID.

The second active session zone 542 includes a first load balancer 546 and a second load balancer 548. The second active session zone 542 may include any number of load balancers, and two are only shown for simplicity and clarity. In this example, the first load balancer 546 is an active load balancer that is configured to route, or direct, computing communications traffic, such as phone system management traffic including signals or messages, to respective endpoints of the second datacenter 504, including clients, devices, and the like which are configured to send and receive phone system management traffic. The first load balancer 546 is configured to receive phone system management traffic associated with the second datacenter 504 from the load balancer 540. The first load balancer 546 is configured to failover to the second load balancer 548 when a failure event is detected at the first load balancer 546. The second load balancer 548 is a standby load balancer that functions as a backup in the event of a failure at the first load balancer 546. If there is a failure at the first load balancer 546, another balancer of the second active session zone 542, such as the second load balancer 548, will route, or direct, the phone system management traffic to respective endpoints of the second datacenter 504. The first load balancer 546 and the second load balancer 548 are shown as an example, and in some implementations, the second active session zone 542 may include more than one active load balancer, more than one standby load balancer, or both.

The second active session zone 542 includes a first web pod 550, a second web pod 552, and a third web pod 554. The second active session zone 542 may include any number of web pods, and three are only shown for simplicity and clarity. The web pods may be grouped into EKS clusters. In this example, the first web pod 550 and second web pod 552 may belong to a first EKS cluster, and the third web pod 554 may belong to a second EKS cluster. In this example, the first EKS cluster may be an active EKS cluster where the first web pod 550 and the second web pod 552 are configured to route, or direct, computing communications traffic, such as phone system management traffic including signals or messages, to respective endpoints. The first EKS cluster is configured to failover to the second EKS cluster when a failure event is detected at the first web pod 550, the second web pod 552, or both. The second EKS cluster may be a standby EKS cluster such that the third web pod 554 functions as a backup in the event of a failure at the first web pod 550, the second web pod 552, or both. If there is a failure at the first web pod 550, the second web pod 552, or both, another web pod of the second active session zone 542, such as the third web pod 554, will route, or direct, the phone system management traffic to respective endpoints. The first web pod 550, the second web pod 552, and the third web pod 554 are shown as an example, and in some implementations, the second active session zone 542 may include more than three web pods, and each EKS cluster may include the same number of web pods.

The storage component 544 may include a database component 556 and a cache component 558. The storage component 544 may store data associated with phone system metadata, such as, for example, phone system management data including extension data, call handling data, phone setting data, call queue data, automatic receptionist data, or any combination thereof, in the database component 556, the cache component 558, or both. The database component 556 may be a relational database management system, and may be an open source system, such as MySQL, for example. The database component 556 may be configured to synchronize data with another database component, such as database component 532, using a service, such as Otter, for example. In an example, the database component 556 may obtain phone system management data associated with the first datacenter 502 from the database component 532, transmit phone system management data associated with the second datacenter 504 to the database component 532, or both. The data may be synchronized using MySQL binlog capture and replay to replicate data from one database component to another database component.

The cache component 558 may store data associated with the second active session zone 510. For example, the cache component 558 may be a distributed cache, such as, for example, a redis in-memory data structure store, that is used to save account information, extension metadata, or both, from the first active session zone 510. The cache component 558 may be configured to synchronize data with another cache component using a service, such as Kafka, for example. In an example, the cache component 558 may obtain phone system management data associated with the first datacenter 502 from the cache component 534, transmit phone system management data associated with the second datacenter 504 to the cache component 534, or both.

The storage component 544 may include one or more shared components, such as, for example, a shared database 536, a shared search component 538, or both. The shared database 536 may be, for example, a NoSQL database service that supports key-value and document data structure, such as DynamoDB global table to synchronize data across active session zones. The shared database 536 may be shared across the first datacenter 502, the second datacenter 504, and the third datacenter 506. The shared search component 538 may be, for example, a distributed, multitenant-capable full-text search engine with a HTTP web interface and schema-free JSON documents, such as ES cluster shared by two active zones. The shared search component 538 may be shared across the first datacenter 502 and the second datacenter 504.

If there is a failure event at the first datacenter 502, for example at the second load balancer 522, the third web pod 528, or both, the first active session zone 510 is configured to failover to the second active session zone 542 at the second datacenter 504. The failover to the second active session zone 542 may be initiated at the cache component 534. For example, the cache component 534 may determine the occurrence of a failure event at the first active session zone 510 based on the account information, extension metadata, or both. The cache component 534 may transmit a message to failover the communications of the first active session zone 510 to the second active session zone 542. The message may include an indication or command to route the phone system management traffic associated with the first active session zone 510 to the second active session zone 542, and may be transmitted via the web zone 508, database component 532, cache component 534, or any combination thereof.

The third datacenter 506 includes a load balancer 560, a standby session zone 562, and a storage component 564. The third datacenter 506 is activated when there is a failure event at the first datacenter 502 and the second datacenter 504, such as a failure of the first active session zone 510 and the second active session zone 542.

The standby session zone 562 includes a first load balancer 566 and a second load balancer 568. The standby session zone 562 may include any number of load balancers, and two are only shown for simplicity and clarity. In this example, the first load balancer 566 is an active load balancer that is configured to route, or direct, computing communications traffic, such as phone system management traffic including signals or messages, to respective endpoints of the third datacenter 506. The first load balancer 566 is configured to failover to the second load balancer 568 when a failure event is detected at the first load balancer 566. The second load balancer 568 is a standby load balancer that functions as a backup in the event of a failure at the first load balancer 566. If there is a failure at the first load balancer 566, another load balancer of the standby session zone 562, such as the second load balancer 568, will route, or direct, the phone system management traffic to respective endpoints of the third datacenter 506. The first load balancer 566 and the second load balancer 568 are shown as an example, and in some implementations, the standby session zone 562 may include more than one active load balancer, more than one standby load balancer, or both.

The standby session zone 562 includes a first web pod 570, a second web pod 572, and a third web pod 574. The standby session zone 562 may include any number of web pods, and three are only shown for simplicity and clarity. The web pods may be grouped into EKS clusters. In this example, the first web pod 570 and the second web pod 572 may belong to a first EKS cluster, and the third web pod 574 may belong to a second EKS cluster. In this example, the first EKS cluster may be an active EKS cluster where the first web pod 570 and the second web pod 572 are configured to route, or direct, computing communications traffic, such as phone system management traffic including signals or messages, to respective endpoints. The first EKS cluster is configured to failover to the second EKS cluster when a failure event is detected at the first web pod 570, the second web pod 572, or both. The second EKS cluster may be a standby EKS cluster such that the third web pod 574 functions as a backup in the event of a failure at the first web pod 570, the second web pod 572, or both. If there is a failure at the first web pod 570, the second web pod 572, or both, another web pod of the standby session zone 562, such as the third web pod 574, will route, or direct, the phone system management traffic to respective endpoints. The first web pod 570, the second web pod 572, and the third web pod 574 are shown as an example, and in some implementations, the standby session zone 562 may include more than three web pods, and each EKS cluster may include the same number of web pods.

The storage component 564 may include a database component 556 and a cache component 568. The storage component 564 may store data associated with phone system metadata, such as, for example, phone system management data including extension data, call handling data, phone setting data, call queue data, automatic receptionist data, or any combination thereof, in the database component 566, the cache component 568, or both. The database component 566 may be a relational database management system, and may be an open source system, such as MySQL, for example. The database component 566 may be configured to synchronize data with another database component, such as database component 556 using a service, such as Otter, for example. In an example, the database component 566 may obtain phone system management data associated with the first datacenter 502 from the database component 532, transmit phone system management data associated with the third datacenter 506 to the database component 532, or both. The database component 566 may obtain phone system management data associated with the second datacenter 504 from the database component 556, transmit phone system management data associated with the third datacenter 506 to the database component 556, or both.

The cache component 568 may store data associated with the standby session zone 562. For example, the cache component 568 may be a distributed cache, such as, for example, a redis in-memory data structure store, that is used to save account information, extension metadata, or both, from the first active session zone 510. The cache component 568 may be configured to synchronize data with another cache component using a service, such as Kafka, for example. In an example, the cache component 568 may obtain phone system management data associated with the second datacenter 504 from the cache component 558, transmit phone system management data associated with the third datacenter 506 to the cache component 558, or both.

The storage component 564 may include one or more shared components, such as, for example, a shared database 536. The shared database 536 may be, for example, a NoSQL database service that supports key-value and document data structure, such as DynamoDB. The shared database 536 may be shared across the first datacenter 502, the second datacenter 504, and the third datacenter 506. The storage component 564 may include a search component 570. The search component 570 may be, for example, a distributed, multitenant-capable full-text search engine with a HTTP web interface and schema-free JSON documents, such as an ES cluster shared by two active session zones. The search component 570 may be synchronized in near-real time with the shared search component 538. The search component 570 may serve as a backup to a primary search component, such as the shared search component 538.

If there is a failure event at the first datacenter 502, the first active session zone 510 is configured to failover to the second active session zone 542 at the second datacenter 504. Subsequently, if there is a failure event at the second datacenter 504, the first active session zone 510 and the second active session zone 542 are configured to failover to the third datacenter 506. The failover to the standby session zone 562 may be initiated at the cache component 558. The cache component 558 may determine the occurrence of a failure event at the second active session zone 542 based on the account information, extension metadata, or both. The cache component 558 may transmit a message to failover the communications of the second active session zone 542, which may include the communications of the first active session zone 510 that were failed over to the second active session zone 542, to the standby session zone 562. The message may include an indication or command to route the phone system management traffic associated with the first active session zone 510, the second active session zone 542, or both, to the standby session zone 562, and may be transmitted via the web zone 508, database component 556, cache component 558, or any combination thereof.

Figure 6:
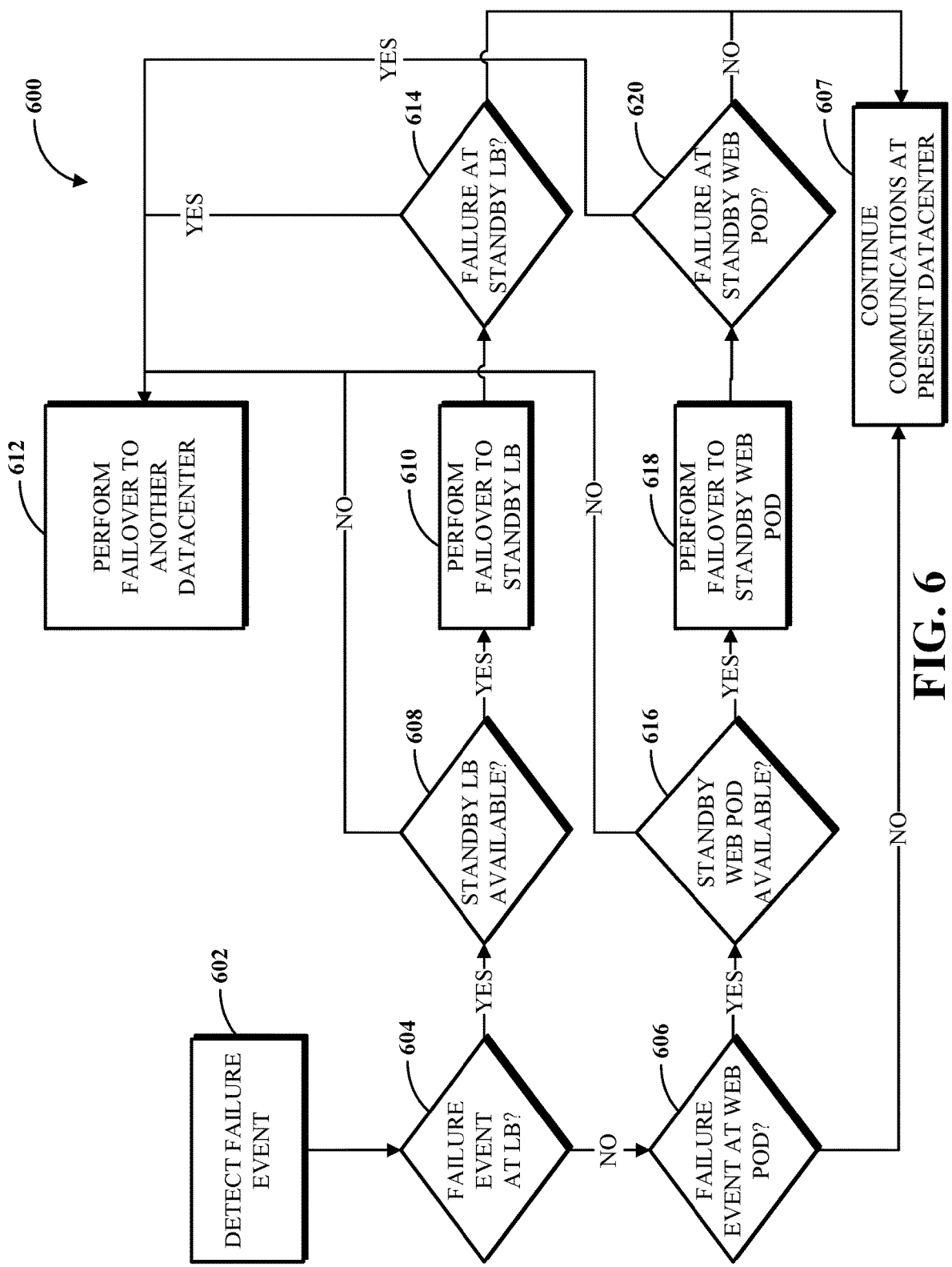
FIG. 6 is a flowchart of an example of a method for performing a failover of phone system management traffic in an active-active standby system.

To further describe some implementations in greater detail, reference is next made to an example method that may be performed by or using an active-active standby system for phone system management. FIG. 6 is a flowchart of an example of a method 600 for performing a failover of phone system management traffic for an active-active standby system when a failure event is detected at an active session zone. The method 600 can be executed using computing devices, such as the systems, hardware, and software described with respect to FIGS. 1-5. The method 600 can be performed, for example, by executing a machine-readable program or other computer-executable instructions, such as routines, instructions, programs, or other code. The steps, or operations, of the method 600 or another technique, method, process, or algorithm described in connection with the implementations disclosed herein can be implemented directly in hardware, firmware, software executed by hardware, circuitry, or a combination thereof.

For simplicity of explanation, the method 600 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The method 600 may be performed by an active-active standby system, such as the system 400 shown in FIG. 4 or the system 500 shown in FIG. 5. The method 600 includes detecting 602 a failure event at an active session zone, such as the first active session zone 410 or second active session zone 434 shown in FIG. 4, or the first active session zone 510 or second active session zone 542 shown in FIG. 5. Detecting the failure event may include determining 604 whether a failure event occurred at a load balancer, such as the first load balancer 420 or first load balancer 440 shown in FIG. 4, or the first load balancer 520 or first load balancer 542 shown in FIG. 5, determining 606 whether a failure event occurred at a web pod, such as the web pod 424 shown in FIG. 4, or both. Example web pod failure events occur when a container node is down, if there is no response to a request, if there is a slow response to a request, or if there is an out of memory (OOM) error. If it is determined 604, 606 that a failure event did not occur at a load balancer, a web pod, or both, the method 600 includes continuing 607 the phone system management traffic at the present datacenter, such as the datacenter 402 or datacenter 404 shown in FIG. 4, or the datacenter 502 or datacenter 504 shown in FIG. 5.

If it is determined 604 that a failure event occurred at a load balancer, the method 600 includes determining 608 whether a standby load balancer, such as, for example, the load balancer 422 shown in FIG. 4, is available. If it is determined that a standby load balancer is available, the method 600 includes performing 610 a failover of the phone system management traffic of the first active zone to the standby load balancer. If it is determined that a standby load balancer is not available, the method 600 includes performing 612 a failover of the phone system management traffic of the first active session zone to another datacenter, such as, for example, the second datacenter 404 shown in FIG. 4, or in an example where the failure event occurred at the second datacenter 404, performing 612 the failover of the phone system management traffic of the second active session zone to the third datacenter 406. If it is determined 614 that a failure event occurred at the standby load balancer after the failover of the phone system management traffic of the first active zone to the standby load balancer, the method 600 includes performing 612 a failover of the phone system management traffic of the first active session zone to a second datacenter, such as the second datacenter 404 shown in FIG. 4, or in an example where the failure event occurred at the second datacenter 404, performing 612 the failover of the phone system management traffic of the second active session zone to the third datacenter 406. If it is determined 614 that a failure event did not occur at the standby load balancer, the method 600 includes continuing 607 the phone system management traffic at the present datacenter, such as the datacenter 402 or datacenter 404 shown in FIG. 4, or the datacenter 502 or datacenter 504 shown in FIG. 5.

If it is determined 604 that a failure event did not occur at a load balancer, the method includes determining 606 whether a failure event occurred at a web pod. If it is determined 606 that a failure event occurred at a web pod, the method 600 includes determining 616 whether a standby web pod, such as, for example, the web pod 428 shown in FIG. 4, is available. If it is determined that a standby web pod is available, the method 600 includes performing 618 a failover of the phone system management traffic of the first active session zone to the standby web pod. If it is determined that a standby web pod is not available, the method 600 includes performing 612 a failover of the phone management traffic of the first active session zone to another datacenter, such as the second datacenter 404 shown in FIG. 4, or in an example where the failure event occurred at the second datacenter 404, performing 612 the failover of the phone system management traffic of the second active session zone to the third datacenter 406. If it is determined 620 that a failure event occurred at the standby web pod after the failover of the phone system management traffic of the first active zone and/or the second active zone to the standby web pod, the method 600 includes performing 612 a failover of the phone system management traffic of the first active session zone and/or the second active session zone to another datacenter, such as the second datacenter 404 shown in FIG. 4, or in an example where the failure event occurred at the second datacenter 404, performing 612 the failover of the phone system management traffic of the second active session zone to the third datacenter 406. If it is determined 620 that a failure event did not occur at the standby web pod, the method 600 includes continuing 607 the phone system management traffic at the present datacenter, such as datacenter 402 or datacenter 404 shown in FIG. 4, or datacenter 502 or datacenter 504 shown in FIG. 5.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and methods can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and methods disclosed herein could employ a number of conventional methods for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system comprising:
a first load balancer associated with a first datacenter, wherein the first load balancer is configured to:
direct system management communications associated with the first datacenter to a first server associated with the first datacenter; and
direct system management communications associated with a second datacenter to a second server associated with the second datacenter;

a second load balancer associated with a third datacenter, wherein the second load balancer is a standby load balancer configured to direct the system management communications during a failure event to a third server associated with the third datacenter, wherein the system management communications are associated with the first datacenter and the second datacenter; and a database controller configured to perform a failover based on the failure event.

2. The system of claim 1, wherein the database controller is configured to perform the failover from the first datacenter to the second datacenter on a condition that the failure event is at the first datacenter.

3. The system of claim 1, wherein the database controller is configured to perform the failover from the second datacenter to the third datacenter on a condition that the failure event is at the second datacenter.

4. The system of claim 1, further comprising:
a first database comprising first data associated with the first datacenter;
a second database comprising second data associated with the second datacenter; and
a third database comprising third data associated with the third datacenter.

5. The system of claim 4, wherein the database controller is configured to synchronize the first data, the second data, and the third data between the first database, the second database, and the third database.

6. The system of claim 4, wherein the first database and the second database form a cluster to perform a search across the first database and the second database using a single search request.

7. The system of claim 6, wherein the cluster is an elastic search cluster.

8. The system of claim 6, wherein data associated with the cluster is synchronized with the third database.

9. The system of claim 8, wherein the data associated with the cluster is synchronized in near-real time.

10. The system of claim 1, further comprising:
a first cache associated with the first datacenter;
a second cache associated with the second datacenter;
a third cache associated with the third datacenter; and
a cache controller configured to synchronize the first cache, the second cache, and the third cache.

11. A method comprising:
detecting a failure event at a first datacenter, wherein the first datacenter includes a first active session zone that includes system management communications associated with the first datacenter;
determining that the failure event occurred at a load balancer of the first active session zone; and
performing a failover of system management communications associated with the first datacenter,
wherein the failover is to a standby load balancer on a condition that the standby load balancer is available, and
wherein the failover is to a second datacenter on a condition that the standby load balancer is not available.

12. The method of claim 11, wherein the failover of the system management communications associated with the first datacenter is to the second datacenter, the method further comprising:
detecting a failure event at the second datacenter, wherein the second datacenter includes a second active session zone that includes system management communications associated with the second datacenter; and
performing, based on the detected failure event at the second active session zone, a second failover of the system management communications associated with the first datacenter and the system management communications associated with the second datacenter to a third datacenter.

13. The method of claim 11, wherein the failover of the system management communications associated with the first datacenter is to the standby load balancer, the method further comprising:
detecting a second failure event at the standby load balancer; and
performing a second failover of the system management communications associated with the first datacenter,
wherein the second failover is to a second standby load balancer of the first active session zone on a condition that the second standby load balancer is available, and
wherein the second failover is to the second datacenter on a condition that the second standby load balancer is not available.

14. The method of claim 13, wherein the second failover of the system management communications associated with the first datacenter is to the second datacenter, the method further comprising:
detecting a third failure event at the second datacenter, wherein the second datacenter includes a second active session zone that includes system management communications associated with the second datacenter; and
performing, based on the detected third failure event at the second datacenter, a third failover of the system management communications associated with the first datacenter and the system management communications associated with the second datacenter to a third datacenter.

15. The method of claim 14, wherein the first datacenter and the second datacenter are active datacenters.

16. The method of claim 14, wherein the third datacenter is a standby datacenter that is activated based on the detection of the third failure event at the second datacenter.

17. A non-transitory computer-readable medium comprising instructions that when executed by a processor, cause the processor to:
detect a failure event at a first datacenter, wherein the first datacenter includes a first active session zoned that includes system management communications associated with the first datacenter;
determine that the failure event occurred at a web pod of the first active session zone; and
perform a failover of the system management communications associated with the first datacenter,
wherein the failover is to a standby web pod on a condition that the standby web pod is available, and
wherein the failover is to a second datacenter on a condition that the standby web pod is not available.

18. The non-transitory computer-readable medium of claim 17, wherein the failover of the system management communications associated with the first datacenter is to the second datacenter, wherein the processor is configured to:
detect a failure event at the second datacenter, wherein the second datacenter includes a second active session zone that includes system management communications associated with the second datacenter; and
perform, based on the detected failure event at the second datacenter, a second failover of the system management communications associated with the first datacenter and the system management communications associated with the second datacenter to a third datacenter.

19. The non-transitory computer-readable medium of claim 17, wherein the failover of the system management communications associated with the first datacenter is to the standby web pod, the processor configured to:
- detect a second failure event at the standby web pod; and
- perform a second failover of the system management communications associated with the first datacenter,
- wherein the second failover is to a second standby web pod of the first active session zone on a condition that the second standby web pod is available, and
- wherein the second failover is to the second datacenter on a condition that the second standby call switch is not available.

20. The non-transitory computer-readable medium of claim 19, wherein the second failover of the system management communications associated with the first datacenter is to the second datacenter, the processor configured to:
- detect a third failure event at the second datacenter, wherein the second datacenter includes a second active session zone that includes system management communications associated with the second datacenter; and
- perform, based on the detected third failure event at the second datacenter, a third failover of the system management communications associated with the first datacenter and the system management communications associated with the second datacenter to a third datacenter.

* * * * *